Sept. 19, 1950  T. B. MONTGOMERY  2,523,046
CONTROL SYSTEM FOR DYNAMOELECTRIC MACHINES
WITH DIFFERENTIALLY EXCITED FIELDS
Filed March 6, 1946
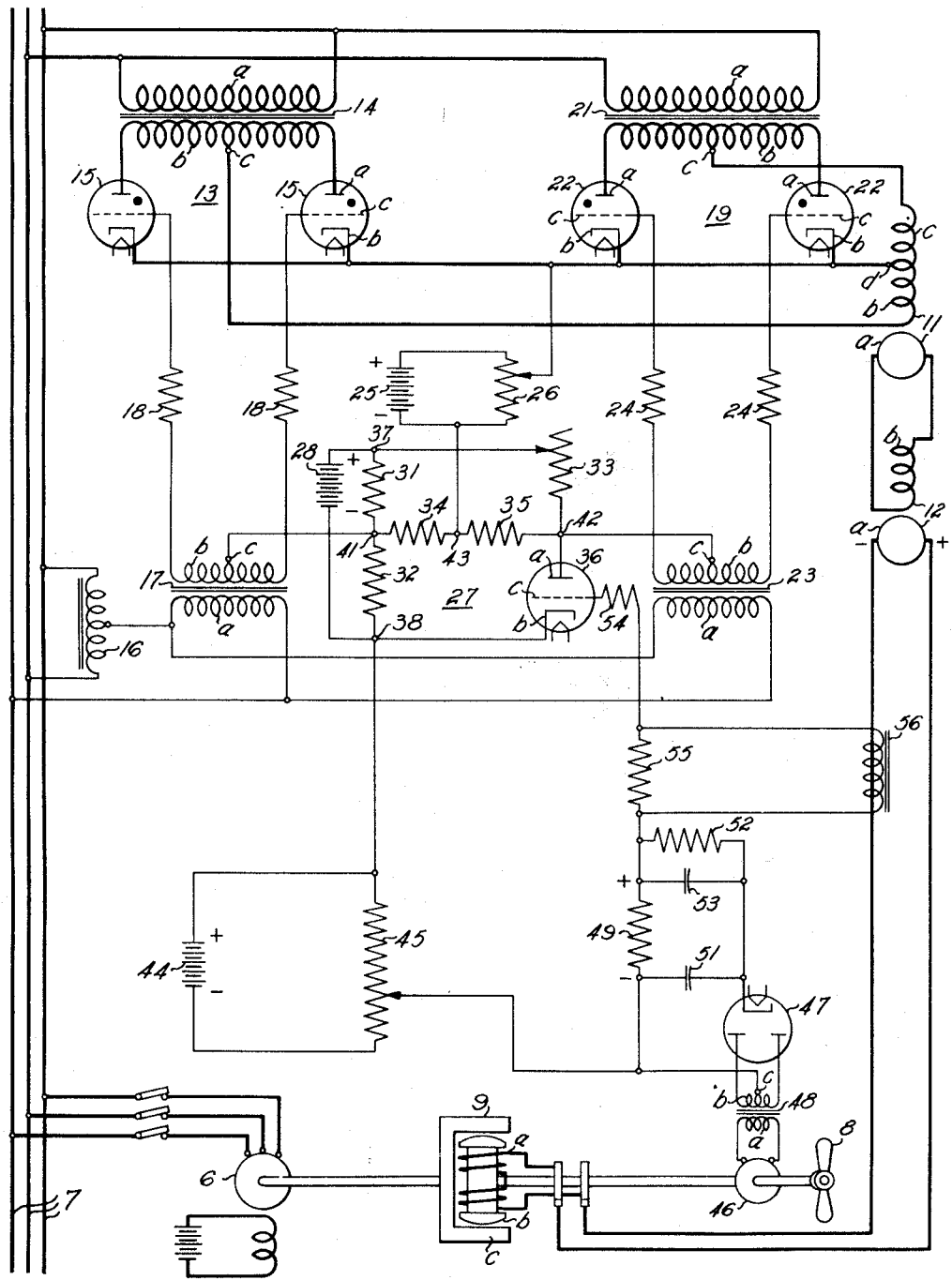
INVENTOR
Terryl B. Montgomery
BY
Didier Journeaux
ATTORNEY Patented Sept. 19, 1950

2,523,046

UNITED STATES PATENT OFFICE 2,523,046

CONTROL SYSTEM FOR DYNAMOELECTRIC MACHINES WITH DIFFERENTIALLY EXCITED FIELDS

Terryl B. Montgomery, Wauwatosa, Wis., assignor to Allis-Chalmers Manufacturing Company, Milwaukee, Wis., a corporation of Delaware Application March 6, 1946, Serial No. 652,315

9 Claims. (Cl. 172—284)

1

This invention relates in general to improvements in electric control systems and more particularly to means for accelerating the regulation of a dynamoelectric machine having a field winding supplied with current from a source of alternating current through a rectifier.

When an operating condition of the armature circuit of a dynamoelectric machine or of another circuit controlled thereby is to be regulated and the regulated circuit is highly inductive, such regulation can be obtained only if the field current of the machine can be given relatively large positive or negative increments in response to relatively small variation of the quantity to be regulated. In extreme cases this requires that the field current of the dynamoelectric machine be frequently reduced to zero and even reversed. In a dynamoelectric machine receiving excitation current from a source of alternating current through a rectifier, the field current may be suddenly increased at any desired rate by providing therefor a rectifier having a sufficiently high maximum output voltage. The rectified current however cannot be reversed, and even when the rectifier is caused to operate as an inverter, reducing its current to zero requires a substantial length of time depending on the inductance of the field circuit.

It is therefore preferable to provide the dynamoelectric machine with a pair of differentially connected field windings and to selectively energize the field windings with variable current from separate rectifiers to vary the magnetic field of the dynamoelectric machine in the desired manner. Such arrangement is particularly useful where the machine merely serves to amplify the output of the rectifier and to supply the amplified energy to the winding of an inductive device such as an eddy current coupling connecting a motor with a load device of which the speed is to be regulated. The two rectifiers may be of the electric valve type and are preferably controlled by a single bridge circuit or other common means operable for simultaneously varying the potentials of the control elements of the valves of the two rectifiers in opposite senses to cause selective energization of the field winding and to vary the currents thereof in accordance with the desired operating condition.

It is therefore an object of the present invention to provide a control system for a dynamoelectric machine whereby oppositely acting rectifier field currents may be selectively supplied to the machine from a source of alternating current.

Another object of the present invention is to

2 provide a control system for a dynamoelectric machine having field windings selectively energized from two oppositely acting rectifiers whereby the rectifiers may be controlled by common regulating means.

Another object of the present invention is to provide a control system for controlling the operation of an inductive device receiving excitation current from a pair of oppositely acting rectifiers through amplifying means of the dynamoelectric type.

Another object of the present invention is to provide a variable speed drive comprising an eddy current coupling in which current for the coupling is supplied by rectifying means and is amplified to the value required for energizing the coupling winding.

Objects and advantages other than those above set forth will be apparent from the following description when read in connection with the accompanying drawing which diagrammatically illustrates one embodiment of the present invention applied to the control of a variable speed drive utilizing an eddy current coupling.

Referring more particularly to the drawing by characters of reference, numeral 6 designates an electric motor of any type of which the speed is not regulated, such as the alternating current synchronous type, which is assumed to be energized from a suitable source of current such as an alternating current circuit 7. Motor 6 is assumed to drive a load device such as a fan 8 operating at variable speed through an eddy current coupling 9 comprising magnetically linked driving and driven members. One of the coupling members is provided with an exciting winding 9a which is energized from circuit 7 through suitable rectifying means, the output of the rectifying means being amplified by a pilot exciter 11 and a main exciter 12. Winding 9a is connected with armature winding 12a of exciter 12, and field winding 12b is connected with armature winding 11a of pilot exciter 11. Armature winding 11a is associated with two differentially connected field windings 11b, 11c having a common terminal 11d. Winding 11b may be energized from circuit 7 through a rectifier generally designated 13 of any suitable known type to establish the necessary magnetic field in pilot exciter 11.

Rectifier 13 may comprise a transformer 14 having a primary winding 14a connected with circuit 7 and having a secondary winding 14b provided with a midtap 14c connected with one of the terminals of winding 11b. The terminals of winding 14b are connected with the anodes 15a of a pair of electric valves 15 having their cathodes 15b connected with terminal 11b. Valves 15 are preferably of the thyratron type provided with control grids 15c but may also be of the ignitron or other suitable type. Grids 15c may be impressed with different potential components including an alternating component of suitable phase and magnitude obtained from circuit 7 through a phase shifting circuit comprising an auto-transformer 16, a grid transformer 17 and a pair of current limiting resistors 18.

Winding 11c may likewise be energized from circuit 7 through a second rectifier 19 comprising a transformer 21 and a pair of thyratrons 22 having their cathodes 22b connected with terminal 11d. Grids 22c may be impressed with different potential components including an alternating component identical to that of grids 15c obtained from circuit 7 through auto-transformer 16, a second grid transformer 23 and a pair of current limiting resistors 24.

A common variable unidirectional potential component may be impressed simultaneously on grids 15c, 22c from any suitable source of direct current, conventionally represented as a battery 25, through a voltage divider 26 having a movable tap connected with cathodes 15b, 22b. To cause rectifiers 13, 19 to selectively supply oppositely acting variable currents to windings 11b, 11c, common means are provided for simultaneously varying the unidirectional potential component of grids 15c, 22c in opposite senses. Such potential variation is effected by means of a bridge circuit generally designated 27 energized from any suitable source of direct current of substantially constant voltage, such as a battery 28.

The bridge circuit comprises five constant resistance elements 31 to 35 and an electric valve of any suitable type such as a triode 36 serving as variable element. The bridge elements define a pair of input terminals 37, 38 connected with battery 28, a pair of output terminals 41, 42 and a neutral terminal 43 intermediate the output terminals. Terminal 41 is connected with grids 15c through a connection joining terminal 41 with the secondary neutral point 17c of transformer 17. Likewise terminal 42 is connected with grids 22c through a connection joining terminal 42 with the secondary neutral point 23c of transformer 23. Terminal 43 is connected with terminal 11d through voltage divider 26. The potential difference between terminals 41, 42 may be varied in response to an operating condition of the system by means connected with cathode 36b of triode 36 for impressing a variable control potential on grid 36c thereof.

The control potential comprises an adjustable constant component obtained from a source of constant unidirectional voltage conventionally represented as a battery 44, through an adjustable voltage divider 45. The control potential further comprises a variable unidirectional component responsive to the speed of fan 8 and obtained from a tachometer generator 46 driven in unison with the fan. The output voltage of tachometer 46 is rectified by any suitable known means such as a full-wave rectifier 47 associated with a transformer 48. The rectified output voltage of rectifier 47 is impressed on a resistor 49 serially connected with voltage divider 45 between cathode 36b and grid 36c. A filter capacitor 51 is provided for rendering the output voltage of rectifier 47 substantially uniform.

The connections between rectifier 47 and resistor 49 comprise a resistor 52 connected in parallel with a capacitor 53 to form an anti-hunting element responsive to the rate of change of the speed of fan 8. Resistor 49 is connected with grid 36c through a current limiting resistor 54 and a resistor or shunt 55. The terminals of resistor 55 are connected with the secondary winding of a current transformer 56 having its primary winding serially connected with armature winding 12a and coupling winding 9a to impress on resistor 55 a voltage responsive to the rate of change of the current of winding 9a and thereby assist the anti-hunting action of resistor 52 and capacitor 53 in response to variations of the current of armature winding 11a.

Additional anti-hunting means responsive to the rate of change of the currents of windings 11b, 12b or to the rate of change of the voltages of armature windings 11a, 12a may be provided to further improve the stability of operation of the system. Such additional anti-hunting means may however generally be omitted if the time constants of windings 11b, 12b are negligible compared to the time constant of winding 9a.

The electrical characteristics of the different control elements of the system cannot be specified generally but are to be selected to meet the operating requirements of each particular system. It has been found that the operation of a 6500 H. P. eddy current coupling may be controlled by means including a pilot exciter requiring a maximum excitation current of 0.5 ampere at 24 volts and of control elements identified by the following engineering data:

| | |
|---|---|
| Thyratrons 15, 22 | type ELC6J |
| Triode 36 | type 6N7 |
| Rectifier 47 | type 6X5 |
| Battery 25 | 40 volts |
| Battery 44 | 105 volts |
| Battery 28 | 300 volts |
| Windings 14b, 21b | 2×40 volts |
| Windings 17b, 23b | 2×3 volts |
| Winding 48b | 2×150 volts |
| Resistor 45 | 2500 ohms |
| Resistor 52 | 10 kilo-ohms |
| Resistor 26 | 10 megohms |
| Resistors 31, 32 | 25 megohms |
| Resistors 18, 24, 33 | 50 megohms |
| Resistor 55 | 80 megohms |
| Resistors 34, 35, 49, 54 | 100 megohms |
| Capacitor 51 | 1 microfarad |
| Capacitor 53 | 16 microfarads |

In operation, circuit 7 being energized, motor 6 is caused to rotate at the synchronous speed thereof to drive one of the elements of coupling 9. When winding 9a receives current the magnetic flux induced thereby in coupling element 9b closes its circuit through coupling element 9c and induces therein eddy curents which cause a torque to be transmitted between the coupling elements. Load device 8 is thus driven at a speed depending on the magnitude of the flow of current through winding 9a and on the torque-speed characteristic of device 8. Excitation current for winding 9a is normally obtained from circuit 7 through rectifier 19 and dynamoelectric machines 11, 12. Rectifier 13 supplies current to winding 11b, thereby causing armature winding 11a to supply amplified current to field winding 12b. The excitation current is further amplified by dynamoelectric machine 12 and supplied to winding 9a.

As a result of the connection between bridge circuit 27 and grids 22c, thyratrons 22 are rendered variably conductive in response to variation in the potential of grid 36c through a lower range of values and are rendered nonconductive in response to the potential of grid 36c being raised above such lower range. Likewise thyratrons 15 are rendered variably conductive in response to variation of the potential of grid 36c through an upper range of values and are rendered nonconductive in response to the potential of grid 36c dropping below such upper range. The lower range of values of the grid potential may be made to correspond to the range of steady state operation of fan 8 at different speeds between zero and the maximum normal speed thereof by suitable choice of auto-transformer 16 and by suitable adjustment of bridge circuit 27 and of voltage divider 26. If the voltages of grid transformers 17, 23 lag ninety degrees behind the voltages of anode transformers 14, 21 and if bridge circuit 27 is balanced when grid 36c is at the potential of the associated cathode 36b, the two ranges of values above defined may be made to be adjacent, to overlap, or to be separated by a gap by varying the adjustment of voltage divider 26. It will be assumed herein that the two ranges are adjacent so that variations of the potential of grid 36c will always result in one of rectifiers 13, 19 being operative to supply variable current to a selected one of windings 11b, 11c but will never cause both rectifiers to be operative simultaneously.

Assuming fan 8 to be driven at a constant speed which is the desired speed established by adjustment of voltage divider 45, rectifier 47 impresses on the terminals of resistor 49 a voltage proportional to the speed of fan 8. Grid 36c is impressed with the resultant of oppositely directed potentials from voltage divider 45 and resistor 49 to maintain triode 36 in a predetermined state of conductivity. Bridge circuit 27 is thus caused to have a predetermined degree of unbalance which results in the appearance of a predetermined positive voltage between terminals 42, 43 and of an equal negative voltage between terminals 41, 43. Grids 22c are thus impressed with a negative potential component from voltage divider 26, a positive potential component from bridge circuit 27, and an alternating component from winding 23b. As a result thereof, rectifier 19 supplies to winding 11c current of the required intensity to maintain the speed of fan 8 at the desired value. At the same time grids 15c are impressed with a negative potential component from resistor 26, another negative potential component from bridge circuit 27, and an alternating potential component from winding 17b whereby thyratrons 15 are continuously maintained nonconductive.

If the speed of fan 8 decreases below the desired value for any reason, the voltage of generator 46 decreases to a corresponding extent, thereby causing the potential of grid 36c to drop. The conductivity of triode 36 decreases and the unbalance of bridge circuit 27 increases to raise the potential of terminal 42 and thereby increase the conductivity of thyratrons 22. Thyratrons 22 supply a higher current to winding 11c, thereby causing the current of winding 9a to increase gradually to a sufficient extent to restore the speed of fan 8 to substantially the value corresponding to the setting of voltage divider 45. During such regulating operation the voltage impressed between grid 36c and cathode 36b is affected by the voltage drop in resistor 52, which varies with the rate of change of the speed of fan 8, and by the voltage impressed on resistor 55, which is proportional to the rate of change of the current in winding 9a. The speed of fan 8 is thus prevented from overshooting the desired value. The same action takes place if the speed setting is raised by downward adjustment of the tap of voltage divider 45.

A sequence of operation converse of that above described takes place when the speed of fan 8 increases above the desired value or when the speed setting is lowered by upward adjustment of the tap of voltage divider 45. The potential of grid 36c then rises and bridge circuit 27 becomes less unbalanced to cause the conductivity of thyratrons 22 to be decreased.

The increase in speed of fan 8 or the change of setting of voltage divider 45 may take place sufficiently rapidly to cause bridge circuit 27 to pass through the balance point thereof to momentarily drop the potential of terminal 42 below the potential of terminal 41. As a result of the herein assumed adjustment of elements of the system, thyratrons 22 are thereby rendered non-conductive and thyratrons 15 are rendered conductive to a variable extent depending upon the degree of unbalance of bridge 27. Winding 11c is thereby deenergized and winding 11b is energized instead. As a result of the differential connection of the two field windings, the magnetic field of pilot exciter 11 is reversed, and the voltage induced in armature winding 11a is reversed in a length of time depending on the inductance of windings 11b, 11c. The inductance of winding 12b prevents the flow of current through armature winding 11a and field winding 12b from reversing instantly, but the current gradually decreases and, if thyratrons 15 remain conductive for a sufficient length of time, the current through winding 12b will eventually reverse. The voltage of armature winding 12a, which is substantially proportional to the current in field winding 12b, is thus caused to decrease at a higher rate than would be possible by allowing the current flow of thyratrons 22 to decay or even by causing thyratrons 22 to invert the magnetic energy stored in field winding 11c into energy returned to circuit 7. It will be apparent that inverting operation of rectifier 19 would only cause the field current of pilot exciter 11 to decrease to zero and would not cause reversal of the field excitation of exciter 12 as is obtained by means of rectifier 13.

The provision of rectifier 13 enables the system to affect the flow of current through coupling winding 9a at the same rate when increasing the speed of fan 8 and when decreasing its speed, thereby avoiding the irregularities which would result from unequal correction of speed decreases and of speed increases. When the speed of fan 8 has been dropped to substantially the desired value by operation of thyratrons 15, the output voltage of tachometer 46 has decreased to a sufficient extent to cause bridge circuit 27 to return through the balance point thereof, thereby causing thyratrons 15 to become nonconductive and again rendering thyratrons 22 conductive to a sufficient extent to cause the current of coupling winding 9a to have the required intensity to maintain the speed of fan 8 at the desired value.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a control system for a dynamoelectric machine having an armature winding and field winding means to be excited from a source of alternating current, the combination of two rectifying systems connected with said source, each of said rectifying systems comprising an electric valve, means connecting said rectifying systems to said field winding means to cause said rectifying systems to supply oppositely acting currents to said field winding means, regulating means for controlling said rectifying systems to cause supply of variable current to said winding means exclusively from one or the other of said rectifying systems, and means responsive to current variations of said armature winding for controlling the operation of said regulating means.

2. In a system comprising a source of alternating current, a motor, and a load device driven by said motor through an eddy current coupling having a winding, the combination of rectifying means connected with said source, means connecting said rectifying means with said coupling winding comprising an amplifying device of the dynamoelectric type for amplifying the output energy of said rectifying means to the value required for supplying said coupling winding, and means responsive to the speed of said load device for controlling said rectifying means.

3. In a system comprising a source of alternating current, a motor, and a load device driven by said motor through an eddy current coupling having a winding, the combination of rectifying means connected with said source, means connecting said rectifying means with said coupling winding, means responsive to the speed of said load device for controlling said rectifying means, and anti-hunting means for said rectifying means comprising means responsive to the rate of change of the current through said coupling winding for controlling the action of said speed responsive means on said rectifying means.

4. In a control system for a dynamoelectric machine having a pair of differentially connected field windings to be excited from a source of alternating current, said windings having a common terminal, the combination of a pair of rectifying systems, each of said rectifying systems being connected with said source and with one of said field windings and comprising an electric valve connected with said common terminal and having a control element, means connected with said common terminal for impressing potential on the different said control elements, and means for simultaneously varying the potentials of said control elements comprising a source of potential, a bridge circuit having input terminals connected with said source and having a pair of output terminals and a neutral terminal intermediate said output terminals, connections between said output terminals and said control elements, a connection between said neutral terminal and said common terminal, and means connected with an element of said bridge circuit for varying the potential difference between said output terminals.

5. In a control system for a dynamoelectric machine having a pair of differentially connected field windings to be excited from a source of alternating current, the combination of a first rectifying system connecting one of said field windings with said source and comprising a first electric valve having a first control element, a second rectifying system connecting the other of said field windings with said source and comprising a second electric valve having a second control element, a source of variable control potential, means connecting said source of control potential with said first control element to cause said first valve to be variably conductive in response to variation of said control potential through a first range of values and to cause said first valve to become nonconductive in response to increase of said control potential above said first range of values, means connecting said source of control potentials with said second control element to cause said second valve to be variably conductive in response to variation of said control potential through a second range of values and to cause said second valve to become nonconductive in response to decrease of said control potential below said second range of values, and means for varying said control potential through said first and second ranges of values.

6. In a system comprising a source of alternating current, a motor, and a load device to be driven by said motor, the combination of an eddy current coupling connecting said motor to said load device and having a winding, means for exciting said winding with variable direct current, said means comprising a dynamoelectric machine having field winding means to be excited from said source of alternating current, two rectifying systems severally connecting said source to said field winding means, and means for selectively rendering said rectifying systems operative to supply oppositely acting currents to said field winding means to cause one of said rectifying systems to supply variable current to said field winding means when said exciting means is to supply current to the winding of said eddy current coupling and to cause the other of said rectifying systems to supply variable current to said field winding means when the current supplied by said exciting means to the winding of said eddy current coupling is to be reduced.

7. In a system comprising a source of alternating current, a motor, and a load device to be driven by said motor, the combination of an eddy current coupling connecting said motor to said load device and having a winding, means for exciting said winding with variable direct current, said means comprising a dynamoelectric machine having field winding means to be excited from said source of alternating current, two rectifying systems severally connecting said source to said field winding means to supply oppositely acting currents to said field winding means, each of said rectifying systems comprising an electric valve having a control element, means for impressing control potentials on said control elements, and means for simultaneously varying the potentials of said control elements in opposite senses to cause selective operation of said rectifying systems to cause operation of one of said rectifying systems for supplying variable current to said field winding means when said exciting means is to supply current to the winding of said eddy current coupling and to cause operation of the other of said rectifying systems for supplying variable current to said field winding means when the current supplied by said exciting means to the winding of said eddy current coupling is to be reduced.

8. In a system comprising a source of alternating current, a motor, and a load device to be driven by said motor, the combination of an eddy current coupling connecting said motor to said load device and having a winding, means for exciting said winding with variable direct current, said means comprising a dynamoelectric machine having a field winding means to be excited from said source of alternating current, two rectifying systems severally connecting said source to said field winding means to supply oppositely acting currents to said field winding means, a tachometer generator driven by said load device for supplying a variable voltage, each of said rectifying systems comprising an electric valve having a control element, means for impressing control potentials on said control elements, a source of reference voltage, means responsive to the difference of said reference and tachometer voltages when the reference voltage exceeds the tachometer voltage for rendering one of said valves variably conductive to supply variable current to said field winding means to cause said exciting means to supply current to the winding of said eddy current coupling, and means responsive to the difference of said reference and tachometer voltages when the tachometer voltage exceeds the reference voltage for rendering the other of said valves variably conductive to supply variable current to said field winding means to reduce the current supplied by said exciting means to the winding of said eddy current coupling.

9. In a system comprising a source of alternating current, a motor, and a load device to be driven by said motor, the combination of an eddy current coupling connecting said motor to said load device and having a winding, means for exciting said winding with variable direct current, said means comprising a dynamoelectric machine having a field winding means to be excited from said source of alternating current, two rectifying systems severally connecting said source to said field winding means to supply oppositely acting currents to said field winding means, a tachometer generator driven by said load device for supplying a variable voltage, a source of reference voltage, means responsive to the difference of said reference and tachometer voltages when the reference voltage exceeds the tachometer voltage for rendering one of said rectifying systems variably operative to supply variable current to said field winding means to cause said exciting means to supply current to the winding of said eddy current coupling, and means responsive to the difference of said reference and tachometer voltages when the tachometer voltage exceeds the reference voltage for rendering the other of said rectifying systems variably operative to supply variable current to said field winding means to reduce the current supplied by said exciting means to the winding of said eddy current coupling.

TERRYL B. MONTGOMERY.

REFERENCES CITED

The following references are of record in the file of this patent:

UNITED STATES PATENTS

| Number | Name | Date |
| --- | --- | --- |
| Re. 16,667 | Hewlett et al. | July 5, 1927 |
| 2,099,468 | Cerstvik | Nov. 16, 1937 |
| 2,121,588 | Eames | June 21, 1938 |
| 2,150,265 | Conover | Mar. 14, 1939 |
| 2,229,448 | Garman | Jan. 21, 1941 |
| 2,276,752 | Willis | Mar. 17, 1942 |
| 2,287,835 | Satterlee | June 30, 1942 |
| 2,330,638 | Stratton | Sept. 28, 1943 |
| 2,333,458 | Alexanderson | Nov. 2, 1943 |
| 2,353,107 | Winther | July 4, 1944 |
| 2,387,601 | Moyer | Oct. 23, 1945 |
| 2,419,462 | Petch et al. | Apr. 22, 1947 |
| 2,449,797 | Waldie | Sept. 1, 1948 |